June 9, 1942.  C. G. JOA  2,286,096
STILE DRILLING APPARATUS
Filed Nov. 6, 1940  4 Sheets-Sheet 1

INVENTOR
CURT G. JOA.
BY
Wheeler, Wheeler & Wheeler
ATTORNEYS.

UNITED STATES PATENT OFFICE 2,286,096

STILE DRILLING APPARATUS

Curt G. Joa, Sheboygan Falls, Wis., assignor to Curt G. Joa, Inc., Sheboygan Falls, Wis., a corporation of Wisconsin Application November 6, 1940, Serial No. 364,487

23 Claims. (Cl. 144—93)

This invention relates to improvements in stile drilling apparatus.

It is a primary object of the invention to provide means whereby work may be fed automatically to and from a drill or series of drills such as those used to bore holes in a door stile or the like. More specifically, it is my purpose to provide an improved mechanism in which work pieces are stored in a hopper and delivered successively into alternate clamps in which the successive work pieces are engaged and positioned about a single drill station and from which the work pieces are preferably automatically removed.

Other specific objects of the invention include the provision of means for moving or oscillating the hopper or parts thereof to assure the continued feed of work pieces therethrough to the drilling station; the bodily movement of the hopper in timed relation to the movement of the clamp pieces for releasing the drilled work and delivering the undrilled work in properly timed relation; the provision of novel and improved means for transmitting motion between the parts; and the provision of a novel work delivering structure.

Other objects will appear more fully from the following disclosure of the invention.

In the drawings:

Fig. 5 is a fragmentary detail in side elevation of the operating connection for one of the discharge conveyors.

Like parts are identified by the same reference characters throughout the several views.

Figure 4:
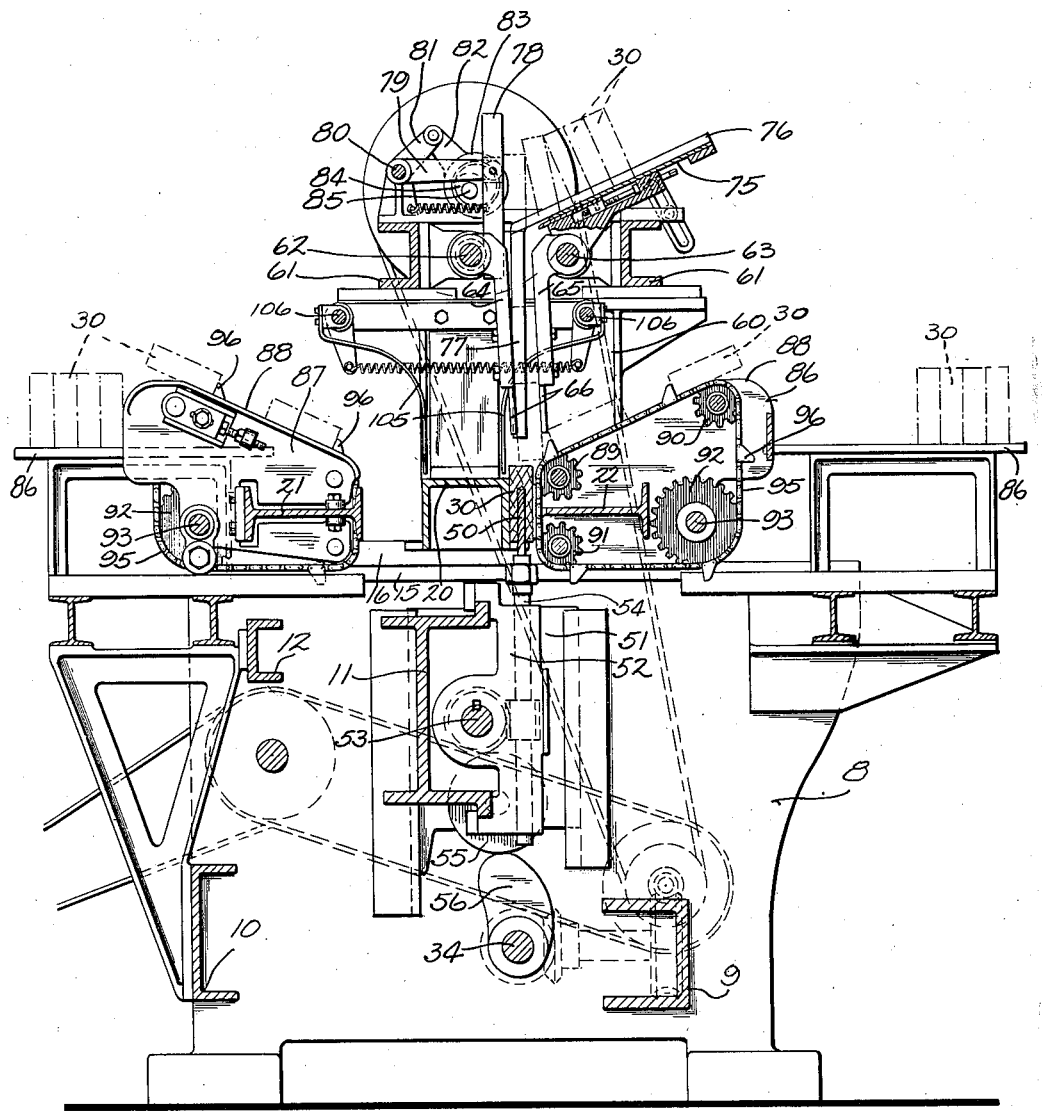
Fig. 4 is a view of the machine in transverse section on the line 4—4 of Fig. 2.

The machine frame comprises the end pedestals 7 and 8 connected by suitable longitudinal channels or beams 9, 10, 11 and 12 as shown in Fig. 4. Each of the pedestals 7 and 8 is provided with a T-shaped head 15 upon which a carriage 16 is reciprocable. Stop members 17 at the end of the guideways provided by the heads 15 are engaged by the set screws 18 on the carriage to limit the range of carriage reciprocation.

Figure 2:
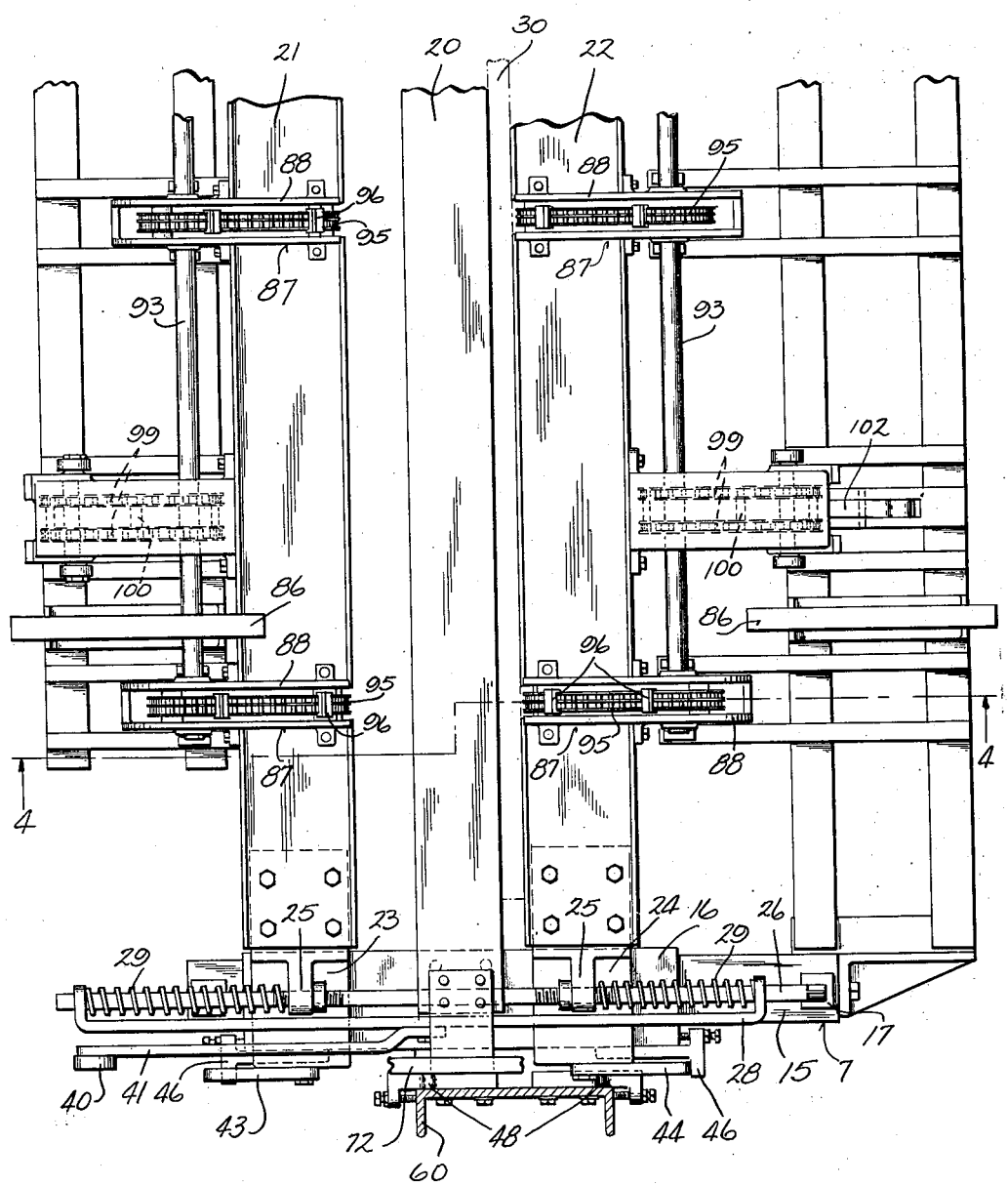
Fig. 2 is a fragmentary detail view in plan of portions of the apparatus at the level of the drilling station and clamps, the superstructure being removed.

Fixed centrally to each of the carriages 16 and connecting such carriages for simultaneous movement, is the box beam 20 (Figs. 2 and 4). Each of the side surfaces of this beam serves as one jaw of a clamp. The complementary and coacting clamp members are the I-beams 21 and 22. The ends of these clamping members 21 and 22 are mounted on slides 23 and 24 respectively. These slides are reciprocable on suitable ways provided on the top surfaces of the respective carriages 16. Thus the entire clamp assembly may be moved in accordance with the movement of the respective carriages 16 upon the frame, but in addition the individual clamping elements 21 and 22 are independently movable to and fro upon their respective slides, supported by the carriages 16, to and from the central box beam 20 with which the clamping elements 21 and 22 both alternatively coact.

Each of the slides 23 and 24 includes an apertured and laterally projecting ear at 25. A guide rod 26 is provided with right and left hand threads like those of a turnbuckle respectively threaded into the ears 25 of the slides 23 and 24 to provide for the adjustment of the slides and the clamping elements 21 and 22 respecting the beam 20 to accommodate different thicknesses of the work pieces receivable into the clamps as hereinafter to be described.

Mounted on the smooth and unthreaded ends of the rods 26 outside of the ears 25 of the respective slides 23 and 24, are the ends of a yoke 28 which is mechanically reciprocated for the purpose of operating the clamps. The clamping pressure is not transmitted positively from the yoke 28 to the rod 26 but is transmitted yieldably through compression springs 29 (Figure 2) which intervene between the ends of the yoke and the ears 25 of the respective slides 23 and 24. With the parts in the positions illustrated in the drawings, the yoke 28 is in its extreme position at the left as viewed in Figs. 1, 2 and 4, with the result that the spring 29 between the yoke and the slide 24 is under compression to engage the clamping element 22 with a work piece 30 confined between clamping element 22 and the central beam 20 which constitutes the other jaw of the clamp. In this position of the parts the clamping element 21 is in its open or inoperative position.

Figure 1:
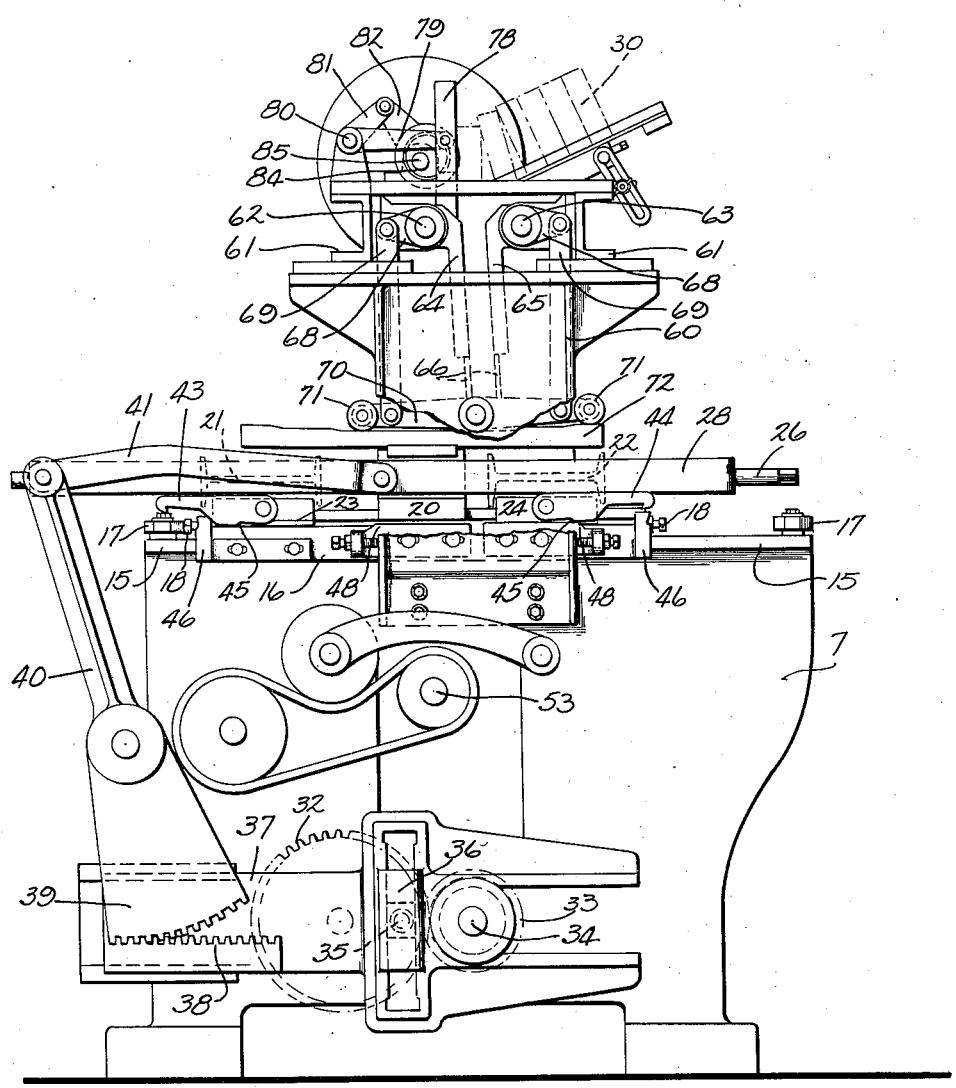
Fig. 1 is a view in end elevation of a stile drilling machine embodying the invention, portions of the support for the overhead structure being broken away to expose the operating connections.

Yoke 28 is reciprocated by the mechanism best shown in Fig. 1. Gear 32 is driven by pinion 33 on a cam shaft 34 later to be described. Gear 32 carries a crank 35 engaged with the cross head 36 of a pitman 37 which carries rack 38. A gear segment 39 mounted on the end of lever 40 meshes with the rack to receive motion therefrom. Lever 40 is connected by link 41 with yoke 28 for reciprocation thereof.

The motion of the yoke primarily applied to the slides 23 and 24 carrying clamping elements 21 and 22 is also used to effect the movement of the carriage 16 through means which will now be described.

Slides 23 and 24 are respectively provided with hooks 43 and 44 in pivotal connection therewith. The under surface of each hook is formed to constitute a cam follower at 45. At its ends the carriage 16 is provided with arms at 46 with which the respective hooks 43 and 44 are engageable during the reciprocation of the slides 23 and 24 on the guideways provided on the upper surface of carriage 16. Thus when either of the slides 23 or 24 is moved upon the carriage by one of the compression springs 29, the pivotal hooks 43 or 44 mounted on said slide are biased by gravity into engagement with one of the arms 46 to pick up the carriage and move the carriage with the slide, thus preventing the clamping element 21 or 22 carried by such slide from closing upon the box beam clamping element 20 which is mounted directly on the carriage. This holds the clamping jaws open in work receiving position until such jaws are positioned beneath the hopper hereinafter to be described. Thereupon the cam follower portion 45 of the hook which is propelling the carriage encounters one of the stationary cams 48 to lift the hook free of the arm 46 of the carriage, whereby to release the carriage. Such release occurs at substantially the time of impact of the set screw 18 with stop 17 at the limit of possible carriage movement and the continued operation of yoke 28 thereafter transmits motion through the compressed spring 29 to the slide engaged by such spring to move the clamping element 21 or 22 into work engaging relation, the work meantime having been positioned between the movable clamping element and the box beam 20.

With the work piece 30 thus positioned and clamped, the drill or drills are moved upwardly into the work piece 30 to bore the desired holes therein. The drill organization is no part of the present invention and will be dscribed only briefly.

The several drills 50 may be positioned as desired to bore holes in any required portion of the work piece 30. For this purpose each drill 50 is mounted on a vertically reciprocable slide 51 supported by a carriage 52 individually adjustable longitudinally of the machine frame on the beam 11. From the lineshaft 53 motion is transmitted to a spindle 54 which is vertically reciprocable with slide 51. Slide 51 carries a cam follower roller 55 actuated by cam 56 on cam shaft 34 to lift the several slides 51 at the proper time in order to cause the drills 50 mounted on spindles 54 to penetrate the work piece 30 held between the box beam 20 and one of the clamping elements 22 at the work station in which the work piece 30 is shown in Fig. 4 and Fig. 2. The slides 51 carrying the drill assemblies as above described are biased by gravity for retraction from the work piece so that as soon as the cam 56 has passed from beneath the clamp follower roller 55 the slide moves downwardly to clear the drills from the work.

The means for delivering the work to and from the drilling station will now be described.

A superstructure mounted on the machine frame carries a hopper from which a substantial number of work pieces may be stored and delivered as needed to the drilling station. Suitable standards 60 at the ends of the machine connected by beams 61 comprise the superstructure. Carried thereby are rock shafts 62 and 63 carrying spaced and substantially parallel depending arms 64 and 65 which, together, provide the hopper throat through which successive work pieces are delivered. Extension pieces 66 on the respective arms permit the effective length of the arms to be varied as desired. These arms are located at any desired spacing along the respective shafts 62 and 63.

Figure 3:
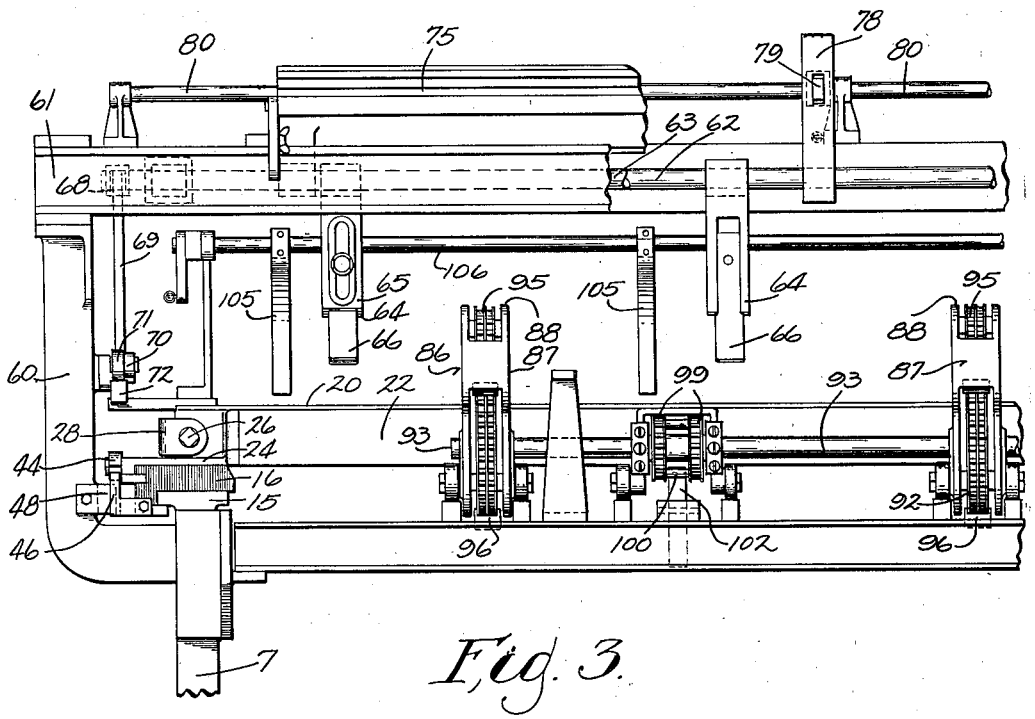
Fig. 3 is a fragmentary detail of the upper portion of the mechanism as it appears in front elevation.

At any convenient point as, for example, at the ends of shafts 62 and 63, such shafts are provided with bell cranks 68 connected by links 69 with a lever 70 provided at its ends with rollers 71 operating over a cam 72 which is mounted on the end of the clamp beam 20 as clearly shown in Figs. 1, 2 and 3. The profile of the cam 72 is so designed as to cause the rock shafts 62 and 63 to oscillate in unison in predetermined synchronism with the movements of the rest of the machine so as to swing the hopper throat elements 64 and 65 from side to side in perfect unison for control of the delivery of the work pieces in the manner hereinafter explained.

The work pieces are stacked on an inclined feed table 75 with their ends abutting a fixed gauge element 76, one arm 77 of which extends downwardly adjacent the hopper throat. Coacting with the inclined feed table 75 to maintain the work pieces 30 erect on edge on the table, is a stop plate 78 which constitutes one wall of the hopper and which is slowly manipulated mechanically during the operation of the machine to free the work pieces from any tendency to adhere to each other or to the hopper and thereby to assure their proper delivery downwardly through the throat. The stop plate, or stop plates 78, (for there may be many of them) are carried by arms 79 from a rock shaft 80 which has another rocker arm 81 connected by link 82 with an eccentric strap 83 actuated by an eccentric 84 mounted on shaft 85 as shown in Figs. 1 and 4. At its lower end each of the stop plates 78 is loosely engaged with the rock shaft 62 of the hopper throat. Preferably the stop plate is slightly notched where it engages such shaft as indicated in dotted lines in Fig. 4, but this is not essential. The notch simply increases the amount of movement which results when the stop plate is actuated by the oscillation of rock shaft 80.

Mounted on suitable brackets at the front and back of the machine are work receiving tables 86 and each of the clamp jaws 21 and 22 carries work discharging conveyors for delivering the work from the clamp to the respective tables 86.

The conveyors are preferably arranged in sets mounted at spaced intervals along the I-beams 21 and 22 which constitute the clamp jaws. Since the sets are identical a description of one will be sufficient.

Each conveyor set includes a sub-frame 87 provided on its exterior with a guide surface at 88 against which the work rests as it is being discharged from the drill station to the receiving table 86. Mounted in the frame are shafts for suitable idler sprockets 89, 90 and 91 and a driving sprocket 92. The shaft 93 for the driving sprocket is common to all of the sets of conveyors mounted on a given clamping element.

Connected to the several sprockets is an endless conveyor chain 95 having suitably spaced spurs at 96 shaped to engage the work from beneath and to lift it from the drilling station.

At some intermediate point between the conveyor sets above described, is an actuator mounted on the respective I-beam 21, 22 including a sprocket 97 carried by shaft 93 and an idler sprocket 98 (Fig. 3 and Fig. 5). Each of the sprockets 97 and 98 is duplex and a pair of chains 99 operate over the double sprockets connected at intervals by bars 100. On the stationary portion 101 of the machine frame is pivoted a pawl 102 biased by a counterweight 103 to assume the position shown in Fig. 5 wherein such pawl is engaged with a stop 104 limiting its clockwise rotation upon its pivot.

When the clamping element or I-beam 22 moves to the right as viewed in Fig. 5 one of the cross bars 100 spanning the space between the chains 99 of the actuator will engage the end of pawl 102. Since the pawl cannot oscillate under the pressure of the cross bar the chain will necessarily be caused to move with respect to the beam in the continued movement of the clamp element, thus rotating shaft 93. This rotation of shaft 93 is communicated to the driving pinions of the several discharging conveyor sets to actuate these in a direction to lift the work piece from the drill statiton and to advance a previously lifted work piece toward the discharge table 86. On the return stroke or movement of the clamp element 22 toward the left as viewed in Fig. 5, the pawl 102 will oscillate from the position in which it is illustrated in a counterclockwise direction to allow the mechanism shown in Fig. 5 to pass freely across the pawl.

Since the thrust of the chain on the work propelling conveyor spurs 96 thereof is vertical in the work lifting portion of their traverse, I preferably provide yieldable spring fingers 105 depending from the rock shafts 106 as a means of forcing the rising work piece to fall laterally onto the guide surfaces 88 of the conveyor sets to be propelled outwardly by the respective sets from the drill station. As shown in Figure 3, the shafts 106 are supported from the box beam 20 by suitable brackets, and in the absence of a stack of work in the machine the spring fingers 105 occupy the positions in which they are shown in Figure 4. But when a column of work is present and a drilling operation is being performed, the right hand spring 105 will have been crowded to the right hand side of the column, the tension of the spring being light and insufficient to hold the work pieces from descending in the feedway. When the drilling operation has been completed and the feedway walls 64 and 65 swung to the left to remove the superposed work pieces from the one that has been drilled, the spring will follow the shifting work pieces to substantially the position in which it is shown in Figure 4, leaving a clear space for upward movement of the drilled work piece. The frames 87 of the respective conveyor sets are so formed as to push across the delivery table 86 the work pieces previously discharged thereon.

The operation of the machine may be summarized as follows. A number of work pieces 30 are kept stacked by the attendant upon the table portion 75 of the feeding hopper. Several of the more advanced work pieces will lie in the feeding throat of the hopper between arms 64 and 65 which move in unison upon rock shafts 62 and 63. The work piece last discharged from the feeding throat will be in the drilling station in which such work piece is shown at 30 in Figs. 2 and 4 where it will be clamped between the box beam 20 of carriage 16 and the complementary clamping element 22 which is mounted at each of its ends upon a slide 24 reciprocable upon the carriage.

With the work piece so clamped the drills 50 have been raised in the course of their rotation to penetrate the work.

As soon as the drills have been retracted from the work, the yoke 28 commences its movement toward the right as viewed in Fig. 1. Its initial movement releases the compression on the right hand spring 29 as viewed in Fig. 2, thereby releasing the clamping pressure on the work piece 30 in the drilling station. At the same time the left hand spring as viewed in Fig. 2, is submitted to compression, thereby causing clamping element 21 to commence to move toward the right upon its slides 23. However, before the clamping element 21 moves very far, the hooks 43 mounted on its terminal slides 23 engage the arms 46 of carriages 16 to move the entire clamp assembly to the right. This bodily withdraws the pierced work piece 30 from the clamping station above the drills and at the same time the discharge conveyor mechanism is set in motion to lift such work pieces for discharge on to the receiving table 86. However, before this work piece can be lifted from its position between jaw 23 and the box beam 20, it is necessary to relieve the work piece of the pressure of successive work pieces in the hopper throat. This is done by the cam 72 engaging roller 71 to oscillate the rock shafts 62 and 63 and thereby to oscillate the entire hopper throat to the left as the carriage is moved to the right. The finished work piece is thereby carried from beneath successive work pieces in the hopper throat and the box beam passes beneath such successive work pieces until the first work piece in the hopper throat drops to the left of the box beam 20 (Figs. 2 and 4) in a position above the drills to be engaged, on this occasion, by the clamping element 21, instead of clamping element 22.

As soon as the work piece has dropped into the drilling station the hook 43 which has been transmitting motion from slide 23 to the carriage, is lifted by engagement with the fixed cam 48 so that the carriage now comes to rest against its stop at 17 and the slides at the ends of I-beam 21 continue their movement to bring such I-beam into resilient pressure engagement with the work and to clamp the work against the central box beam 20 at the drilling station.

The drill sets are now raised once more to clamp with the work, and following their retraction the counterpart of the cycle above described is repeated, the only difference being that since the left hand clamp organization is now operative at the drilling station, the work piece now drilled will be removed by the discharge conveyors mounted on I-beam 21 and will be delivered to the left as viewed in Figs. 2 and 4.

As the yoke 28 reverses its movement, the clamping pressure of the I-beam 21 from the work is released, the hooks 44 of slides 24 pick up the carriage and commence to move it to the left, while at the same time the hopper throat arms 64 and 65 oscillate to the right and the work piece, thus relieved of the load of superimposed work pieces, is discharged upwardly and outwardly to the left.

The driving connections for operating the various parts are illustrated herein but no detailed

I claim:

1. A device of the character described comprising the combination of means for clamping work at a drilling station, of hopper means for feeding work to such station, mechanism for relatively displacing said hopper means and said clamping means upon the completion of a drilling operation at said station, and means controlled by said mechanism for removing the drilled work piece along a path, the receiving end of which has been cleared by displacement of said hopper means.

2. In a device of the character described, the combination with clamping means adapted to act on a work piece at a drilling station, said clamping means including relatively reciprocable work engaging clamp parts, of a hopper including throat elements normally adapted to deliver work to said clamping means and mounted for bodily movement respecting said clamping means whereby to displace work in said hopper from work engaged in said clamping means between said parts, a drill element at said station for operation upon the clamped pieces of work, and means for mechanically and successively shifting the drill eelment to and from drilling position and removing drilled work pieces at intervals when said drill element is removed from drilling position.

3. In a device of the character described, the combination with clamping means operable upon a work piece at a drilling station and a carriage on which said clamping means is mounted for bodily movement, said clamping means including a part relatively movable upon said carriage and a second part with which the relatively movable part coacts, a hopper for delivering work pieces successively to said clamping parts to be clampingly engaged thereby, and mechanism for producing relative displacement between said hopper and said second clamping part to facilitate removal of the work from said station during intervals between drilling operations.

4. In a device of the character described, the combination with clamping means operable upon a work piece and drilling station and a carriage on which said clamping means is mounted for bodily movement, said clamping means including a part relatively movable upon said carriage and another part with which the relatively movable part coacts, a hopper for delivering successive work pieces to said parts to be clampingly engaged thereby, and mechanism for producing relative displacement between said hopper and said clamping means, said hopper including a movable throat portion and said displacement mechanism including connections to said throat and to said carriage for the operation of said throat portion and said clamping means in opposite directions.

5. In a device of the character described, the combination with clamping means operable upon a work piece and drilling station and a carriage on which said clamping means is mounted for bodily movement, said clamping means including a part relatively movable upon said carriage and another part with which the relatively movable part coacts, a hopper for delivering successive work pieces to said parts to be clampingly engaged thereby, and mechanism for producing relative displacement between said hopper and said clamping means, said hopper including a movable throat portion and said displacement mechanism including connections to said throat and to said carriage for the operation of said throat portion and said clamping means in opposite directions, and a discharge conveyor provided with mechanism for automatically effecting its operation to deliver a work piece from said clamping means following the relative displacement of said clamping means and said throat portion as aforesaid.

6. In a device of the character described, the combination of clamping means and a hopper including throat mechanism for delivering successive work pieces to said clamping means, of a plate comprising one wall of said hopper and provided with connections for moving the plate longitudinally of the line of work delivery in a transverse vibratory movement whereby to assure the discharge of work pieces from said hopper through said throat mechanism.

7. In a device of the character described, a hopper comprising the combination with an inclined feed table adapted to receive work pieces resting on edge thereon, of a stop plate spaced from said work table, a pair of rock shafts at either side of the space between the table and plate, arms comprising a hopper throat suspended on said rock shaft at either side of said space, means for oscillating said rock shaft and means for moving said plate.

8. In a device of the character described, the combination with a clamping member, of a clamping element mounted for movement to and from the member, means for retracting the clamping element from the member to release a work piece clamped between the element and the member, a work receiving table toward which said element moves in the course of its retraction from said member, discharge conveyor means connected with the element to partake of its retractive movement, said conveyor means including work propelling mechanism for delivering toward said table work released from clamping engagement upon the movement of said element.

9. A device of the character described comprising the combination with a carriage and a clamping member mounted thereon, of slide means mounted on the carriage, a clamping element on the slide means movable to and from engagement with a work piece confined between said element and member, work discharging conveyor means mounted on said slide means, and conveyor propulsion mechanism including relatively movable parts coacting in accordance with the movement of said carriage.

10. In a device of the character described, the combination with tool means movable to and from a work piece at a given station, of a duplex clamp set for supporting successive work pieces at said station and comprising a carriage movable transversely across said station, a clamp member mounted on the carriage to engage alternate sides of successive work pieces at said station, clamping elements provided with slides supported on said carriage and movable to and from said member at opposite sides thereof whereby to clamp successive work pieces to opposite sides of said member, means for reciprocating said carriage discharge conveyor means associated with the respective elements, mechanism for operating said discharge conveyor means upon the release of each element from the work piece engaged thereby to discharge such element, and means for delivering successive work pieces into engagement alternately between said member and the respective elements.

11. In a device of the character described, the combination with a hopper provided with a feeding throat for the delivery of successive work pieces, of a duplex clamp set adapted to receive such work pieces and mounted for bodily movement respecting said hopper throat, said clamp set comprising a carriage, a clamping member mounted on the carriage and adapted to engage successive work pieces at opposite sides thereof, clamping elements coacting with the opposite sides of said member for engagement with alternate work pieces, means for reciprocating said carriage respecting said hopper throat whereby to register said hopper throat with opposite sides of said member, said means including mechanism for actuating the respective elements into clamping engagement with work pieces at opposite sides of said member, and conveyor means including operating connections actuated in the reciprocation of said carriage for discharging in opposite directions from said member the work pieces engaged with alternate sides thereof, upon the release of said work pieces by said elements.

12. A device of the character described comprising the combination with tool means operable at a given station, of a clamping member movable between opposite sides of said station and provided with opposite faces alternately engageable with work pieces at said station, a carriage upon which said member is mounted, clamping elements coacting alternately with opposite sides of said member and mounted on said carriage for movement respecting said member, means for yieldably actuating said elements alternately to and from said member, and means whereby motion transmitted to said elements is imparted to said carriage for the reciprocation thereof.

13. A device of the character described comprising the combination with tool means operable at a given station, of a clamping member movable between opposite sides of said station and provided with opposite faces alternately engageable with work pieces at said station, a carriage upon which said member is mounted, clamping elements coacting alternately with opposite sides of said member and mounted on said carriage for movement respecting said member, means for yieldably actuating said elements alternately to and from said member, and means whereby motion transmitted to said elements is imparted to said carriage for the reciprocation thereof, together with stops defining a predetermined range of carriage movement, and mechanism for releasing said carriage from propulsion with said elements at least upon impact of said carriage with said stop means.

14. A device of the character described comprising the carriage, a clamping member mounted thereon, slides movable respecting the carriage toward opposite faces of said member, clamping elements cooperable with opposite faces of said member and mounted on the respective slides, means for yieldably propelling said clamping elements in opposite directions into alternate cooperative engagement with work pieces abutting opposite faces of said member, releasable motion transmitting connections between the respective slides and said carriage whereby the yieldable movement of said slides transmits motion to said carriage to preclude the closing of the respective elements upon said member, stop means limiting the movement of said carriage, and mechanism for releasing said connections for the continued movement of said slides whereby to advance the respective elements alternately into clamping engagement with said work pieces.

15. A machine of the character described comprising the combination with a tool spindle at a predetermined station, of a clamping member provided with a carriage, said carriage being movable to position said clamping member alternately at opposite sides of a work piece at said station, slide means mounted on said carriage at each side of said member, a first clamping element mounted on one such slide means and cooperative to clamp a work piece against one side of said member, a second clamping means mounted upon another section of slide means and operable respecting said carriage to clamp a work piece against the other side of said member, means for the operative reciprocation of said carriage and the concurrent movement of the respective clamping elements upon their respective slide means to and from said member, a discharge conveyor associated with the clamping element movable from said member for discharging a work piece from between said member and said last mentioned element, mechanism for actuating said conveyor in the course of the reciprocation of said carriage.

16. A machine of the character described comprising the combination with a tool spindle at a predetermined station, of a clamping member provided with a carriage, said carriage being movable to position said clamping member alternately at opposite sides of a work piece at said station, slide means mounted on said carriage at each side of said member, a first clamping element mounted on one such slide means and cooperative to clamp a work piece against one side of said member, a second clamping means mounted upon another section of slide means and operable respecting said carriage to clamp a work piece against the other side of said member, means for the operative reciprocation of said carriage and the concurrent movement of the respective clamping elements upon their respective slide means to and from said member, a discharge conveyor associated with the clamping element movable from said member for discharging a work piece from between said member and said last mentioned element, mechanism for actuating said conveyor in the course of the reciprocation of said carriage, a feeding hopper including a throat comprising spaced arms arranged to deliver successive work pieces to alternate sides of said member to be engaged by the respective elements, and means for moving said hopper throat oppositely to the movement of said carriage whereby to clear a work piece propelled by said discharge conveyor.

17. In a device of the character described, the combination with tool means and opposed work feeding means spaced from the tool means, of a central clamping member having clamping faces at its opposite sides, carriage means upon which said clamping member is mounted for reciprocation across the space between said work feeding means and said tool means, second and third clamping members mounted on the carriage for movement therewith and independently movable to and from clamping engagement with said central clamping member, power connections for intermittently reciprocating the carriage to bring opposite faces of said central clamping member alternately into registering position with respect to said work feeding means and tool means, and motion transmitting connections for adjusting the second and third clamping members alternately to and from clamping coaction with said central clamping member in timed relation with carriage movement, whereby to clamp work to the opposite faces of said central member as such faces alternately move to said position.

18. In a device of the character described, the combination with work feeding means, of multiple clamping means comprising a central clamping member and lateral clamping members engageable with opposite sides thereof, a carriage upon which one of said means is mounted for bodily translation with respect to the other between positions in which said work feeding means registers for such delivery to opposite clamping faces of said central member, power connections for the reciprocation of the carriage between said positions, and means for moving said lateral clamping members with respect to said central clamping member to alternately engage work at each of said positions and to release such work in movement of said carriage from the respective positions.

19. The combination with a tool set, of a carriage movable across the tool set between separate positions for work presentation to said set, central clamping means on said carriage having its opposing faces located to register work with said tool set at said positions, a work feeder above said tool set comprising means for delivering successive work pieces alternately to opposite faces of said central clamping means in the respective positions thereof, complementary clamping elements mounted on said carriage for translative movement therewith and independently movable respecting the carriage to and from engagement with work pieces abutting the opposite faces of said clamping means, and means for adjusting the respective clamping elements to work engaging proximity to the respective complementary faces of said central clamping means in timed relation to the movment of said respective faces to said positions, whereby work pieces from a single hopper are alternately clamped to opposite faces of said central clamping means in operative relation to said tool set.

20. The structure of claim 19, in combination with work discharge conveyor means mounted upon said carriage and associated with each of the opposite faces of said central clamping means for delivering work pieces therefrom, and connections for the alternate actuation of said conveyor means in timed relation to the movement of said carriage from each of said positions for the delivery from said central clamping means of work which has been clamped adjacent said tool set.

21. In a device of the character described, the combination with a tool set and means for the advance and retraction thereof, of a carriage reciprocable across said tool set and provided with a plurality of work-receiving clamping means, motion transmitting connections for the opening and closing of the respective clamping means, said connections being adapted to actuate said clamping means for work engagement as the respective clamping means register with said tool set and for work release as the respective clamping means leave said tool set, and a work piece feeder arranged to deliver work pieces alternately to the respective clamping means preliminary to the movement of said clamping means to work engagement.

22. The device of claim 21, in combination with separate work discharge conveyor means upon said carriage and mechanism for the actuation thereof upon the release of work pieces by the respective clamping means.

23. The combination with a tool set and means for intermittingly advancing and retracting the tools, of a carriage reciprocable across the line of such advance and retraction and provided with two work receiving stations, means for clamping work pieces at the respective stations in alternation for presentation to the tools at the respective ends of the carriage stroke, infeeding means for delivery of work alternately to said positions on the carriage, and outfeeding means mounted on the carriage on opposite sides of the space occupied by the work receiving stations.

CURT G. JOA.